United States Patent [19]

Vanderlinden et al.

[11] 3,720,707

[45] March 13, 1973

[54] PROCESS FOR REDUCING THE SULFURIC ACID CONTENT OF ALKYLARYLSULFONIC ACIDS

[75] Inventors: Andre Jacques Emile Vanderlinden; Pierre Marie Joseph Chislain de Radzitzky D'Ostrowick, both of Brussels, Belgium

[73] Assignee: Labofina Soc. AN., Bruxelles, Belgium

[22] Filed: Feb. 27, 1970

[21] Appl. No.: 15,200

[52] U.S. Cl. ................................260/505 P
[51] Int. Cl. ................................C07c 143/24
[58] Field of Search ................................260/505 P

[56] References Cited

UNITED STATES PATENTS 2,899,460    8/1959    Sias et al. ................260/505 P Primary Examiner—Bernard Helfin
Assistant Examiner—A. Siegel
Attorney—Sol B. Wiczer

[57] ABSTRACT

The sulfuric acid content of alkylarylsulfonic acids obtained by sulfonation with sulfuric acid is reduced by treating said sulfonic acids with ammonia or an ammonium salt in quantity to form crystalline ammonium acid sulfate which is easily separated such as by filtration.

12 Claims, No Drawings

PROCESS FOR REDUCING THE SULFURIC ACID CONTENT OF ALKYLARYLSULFONIC ACIDS

This invention relates to removal of sulfuric acid contamination of alkylarylsulfonic acid formed in the strong acid sulfonation of alkylaromatic compounds. More particularly the free sulfuric acid is converted to easily separated ammonium hydrogen sulfate crystals.

The classical processes for sulfonation of alkylaromatic compounds, either present in petroleum fractions or synthesized by alkylation of benzene with an olefin or an alkyl chloride, most often use sulfuric acid enriched with various quantities of sulfur trioxide (oleum), or even gaseous sulfur trioxide. Even after separation of the spent sulfuric acid, and even if the possible excess of sulfur trioxide is converted into sulfuric acid with water immediately after the sulfonation has taken place and the mixture is settled, or even if water is added after a first separation of the spent acid and a second settling of the dilute acid is carried out, important amounts of sulfuric acid always remain in the sulfonic acids formed. The sulfuric acid content of the latter may amount to as much as 15 weight percent of the total weight of sulfonic acids and sulfuric acid.

The presence of sulfuric acid in alkylarylsulfonic acids even at a concentration as low as 1 percent is detrimental for many uses of the alkylarylsulfonic acids. Indeed, when these acids are neutralized with an alkali in order to prepare emulsifying compositions or rust-preventing compounds, the presence of an alkali metal sulfate may impair the emulsifying power of the alkylarylsulfonate and promote corrosion. When said acids are neutralized with alkaline earth metal bases in order to obtain detergent additives for oils, the impurity of sulfuric acid forms highly dispersed alkaline earth metal sulfates, which makes the filtration of these additives very difficult and seriously decreases their dispersant power.

Several processes were suggested in the art to reduce this sulfuric acid content but all have disadvantages of poor economy and/or efficiency. Processes based on extraction require the use of oxygenated solvents, several successive extractions and at least one evaporation of the solvent. Processes based on the precipitation of an alkaline earth metal sulfate require a comparatively long reaction time and often give rise to very serious difficulties relating to the separation of the precipitate, which is extremely fine. Moreover, it appears difficult to completely prevent neutralization of part of the sulfonic acids. Therefore, when it is intended to prepare the sulfonate of a metal other than that used for the purification, the end product will in any instance be contaminated by the alkaline earth metal used for the purification of the sulfonic acids.

The process according to the present invention eliminates these drawbacks and offers numerous advantages over the processes previously disclosed.

According to the present invention, the residual sulfuric acid content of alkylarylsulfonic acids having a molecular weight ranging from 300 to 650 is lowered by treating said acids at a temperature between 0° and 80° C with a neutralizing agent selected from the group comprising ammonia and ammonium salts of acids at least one valency of which has an acidity equal to or lower than that of the alkylarylsulfonic acids, the ratio of neutralizing agent being such that the number of equivalents of ammonia added be equal to the sum of the number of moles of residual sulfuric acid and of between 0 and 30 percent of the number of moles of alkylarylsulfonic acids, then separating the crystalline ammonium hydrogen sulfate formed.

In another aspect, the invention consists of carrying out this neutralization reaction on a mixture of alkylarylsulfonic acids and of a solvent selected from the group comprising liquid hydrocarbons and chlorinated hydrocarbons in which the mixture contains from 1 to 75 percent of solvent.

Under the above-stated operating conditions, ammonium hydrogen sulfate is formed preferentially to diammonium sulfate. Neutralization by ammonia of residual sulfuric acid on the one hand and that of alkylarylsulfonic acids on the other hand are competitive reactions leading to an equilibrium, strongly displaced in favor of neutralization of sulfuric acid because of the low solubility of ammonium hydrogen sulfate in the medium.

When ammonia is used as a neutralizing agent, the reactivity of both residual sulfuric acid and alkylarylsulfonic acids is very high: thus the rate of introduction of ammonia is only limited in practice by the factor of adequate contact between gaseous and liquid phases. Therefore, the operation is especially suited for being carried out in a continuous reactor.

An equivalent amount of a neutral ammonium salt of an acid, one valency at least of which has an acidity equal to or less than that of the alkylarylsulfonic acids to be purified, may be substituted for ammonia. Thus neutralization may be carried out by means of an ammonium salt of a volatile weak acid such as a sulfide, a bicarbonate or preferably a carbonate. When such an ammonium salt is used, the evolution of the volatile weak acid displaced during the reaction of the salt with sulfuric acid and sulfonic acids has to be provided for.

Ammonia may also be replaced with diammonium sulfate: one mole of the latter reacts with one mole sulfuric acid, yielding two moles ammonium hydrogen sulfate which precipitates because of its insolubility in the medium. Moreover, as a neutralization equilibrium also takes place with sulfonic acids, the same number of moles of diammonium sulfate must be used in order to obtain the identical result as obtained in the case of ammonia. This results in the same neutralization ratio for sulfonic acids, in the same residual sulfuric acid content and in the precipitation of a much higher amount of ammonium hydrogen sulfate.

When an ammonium salt is used, the reaction time is controlled by the agitation rate and by the granulometry of the salt. A contact time of from one to two hours is commonly sufficient. The use of gaseous ammonia is thus preferred as it gives rise to a higher reaction rate without evolution of any other gas. As the precipitation of ammonium hydrogen sulfate is controlled by an equilibrium, precipitation of this salt may be promoted by addition to the alkylarylsulfonic acids to be purified of an ammonium alkylarylsufonate. Such addition may be in an amount at least sufficient to wholly convert the sulfuric acid into ammonium hydrogen sulfate by an exchange reaction, and that from 0 to 30 percent ammonium sulfonates remain in the medium.

The amount of ammonia or ammonium salt to be used in order to obtain a fair removal of sulfuric acid has to be high enough to neutralize sulfuric acid wholly to ammonium hydrogen sulfate and from 0 to 30 percent of the alkylarylsulfonic acids. The best results are obtained from neutralization of between 5 and 20 percent of the alkylarylsulfonic acids. Using a lesser amount of ammonia or of an ammonium salt effects only a partial precipitation of ammonium hydrogen sulfate. A higher quantity of ammonia results in exceedingly extensive neutralization of sulfonic acids and effects suspension in colloidal form (peptization) of the ammonium hydrogen sulfate or even diammonium sulfate, so that they are no longer as easily separable by settling, filtering or even centrifuging. If the amount of ammonia or ammonium salt is within the limits stated, a certain amount of ammonium alkylarylsulfonates is always formed. This partial neutralization does not involve any drawback for in the course of the subsequent preparation of alkali or alkaline earth metal sulfonates, the ammonia, as a weak and volatile base, undergoes a complete displacement from the product and may even be recovered if desired.

The fact that no nonvolatile, i.e., ash-forming, base is introduced, into the system, is a specific advantage of the invention compared to the known processes for purifying alkylarylsulfonic acids which resort to alkaline earth bases. The reaction temperature is not critical and may range from e.g., 0° to 80° C. It is expedient to start the reaction between room temperature and 45° C, as the heat of reaction will still definitely increase the temperature and supply a fair fluidity to the medium.

The new process also comprises separating ammonium hydrogen sulfate by known methods such as settling, filtering and centrifuging. Separation is outstandingly easy, owing to the comparatively large size of the crystals formed.

Practically any type of alkylarylsulfonic acid having a molecular weight between 300 and 650 may be purified according to this method. Among those which lend themselves best thereto, the following can be mentioned: sulfonic acids from dodecylbenzene having a straight or branched alkyl chain and those from the corresponding heavy alkylates; sulfonic acids from polypropylene-benzene alkylates; sulfonic acids from mono- and dialkylnaphthalenes; and sulfonic acids resulting from the treatment of mineral oils with oleum.

As undiluted sulfonic acids have a high viscosity, it is often desirable, though not essential, to carry out the treatment with ammonia or ammonium salts according to the new process on solutions containing from 1 to 75 percent solvent, the concentration range being non-critical. The organic solvents used may be of various types, and consist e.g., of those used during sulfonation; hydrocarbons and their chlorinated derivatives are preferred as solvents.

The sulfur dioxide possibly dissolved in the sulfonic acids seems not to react with ammonia under the conditions of the process, and may be removed during vaporization of the solvent or by bubbling of an inert gas through the liquid product.

Other characteristics and advantages of the invention will become apparent from following examples given for an illustrative, not restrictive, purpose.

The examples relate to the reduction of the free sulfuric acid content of several alkylarylsulfonic acids (A to F), the preparation of which is described hereafter.

A. The starting material consists of a polypropylene-benzene alkylate having an average molecular weight of 520 and a viscosity of 368 cst at 100° F and 17.7 cst at 210° F. Within 15 minutes 0.75 part of oleum containing 20 percent sulfur trioxide is added to 1 part of alkylate and 1 part of hexane. Reaction temperature is being kept between 45° and 50° C. Either 22 percent vol. of water, calculated on the oleum used, may be added within 10 minutes and the acid sludge settled, or a first settling of acid sludge may be carried out, followed by the addition within 10 minutes of 10 percent weight of water, calculated on the difference between the weight of oleum and that of the acid sludge collected, and effect a second settling. The sulfuric acid content of the diluted sulfonic acids is almost identical in either case and ranges from 1 to 2 percent, i.e., ca. from 2 to 4 percent based on the sulfonic acids. In the case considered, the composition of the acid mixture is:

45 percent sulfonic acids
1.6 percent sulfuric acid
8 percent unsulfonated alkylate
45.4 percent hexane.

These sulfonic acids will be called hereafter sulfonic acids A.

B. A rectified heavy alkylate resulting from the synthesis of a branched chain dodecylbenzene with an average molecular weight of 410, a 5 percent temperature of 352° C and a viscosity of 108 cst. at 100° F and 7.73 cst at 210° F, is sulfonated in substantially the same way. In this instance, 1 part oleum was used instead of 0.75 part as in the first case. The composition of resulting sulfonic acids is:

48 percent sulfonic acids
1.7 percent sulfuric acid
4.5 percent unsulfonated alkylate
45.8 percent hexane.

These sulfonic acids have an average molecular weight of 490 and will be called hereafter sulfonic acids B.

C. A straight heavy alkylate resulting from the synthesis of a branched chain dodecylbenzene having an average molecular weight of 330, a 5 percent distillation temperature of 328° C and a viscosity of 47.5 cst at 100° F and 5.22 cst at 210° F, was sulfonated in substantially the same way. In this instance, 1.25 part oleum was used instead of 0.75 part as in the first case. The composition of resulting sulfonic acids is:

45 percent sulfonic acids
1.6 percent sulfuric acid
9.5 percent unsulfonated alkylate
43.9 percent hexane.

These sulfonic acids have an average molecular weight of 410 and will be called hereafter sulfonic acids C.

D. Sulfonation of a commercial branched chain dodecylbenzene took place starting from 1 part dodecylbenzene and 2 parts 100 percent sulfuric acid. After reaction was achieved, 0.2 part water was added, calculated on sulfuric acid and settling of acid sludges was carried out. The composition of resulting sulfonic acids is:

88.5 percent sulfonic acids
10.9 percent sulfuric acid 0.6 percent unsulfonated alkylate.

These sulfonic acids have a molecular weight of 330 and will be called hereafter sulfonic acids D.

E. Sulfonic acids were prepared according to method B, but without the addition of water; after having settled for 18 hours, sulfonic acids were obtained, the composition of which is:
- 47.1 percent sulfonic acids
- 5.3 percent sulfuric acid
- 4.4 percent unsulfonated alkylate
- 43.2 percent hexane.

These sulfonic acids will be called hereafter sulfonic acids E.

F. A "150 Solvent Neutral" mineral oil containing 32 percent aromatics according to Mills' method, was sulfonated. Said oil has a viscosity of 32.2 cst at 100° F and 5.3 cst at 210° F. Sulfonation itself was preceeded by sulfuric acid washing. To 1 part oil 0.3 part concentrated sulfuric acid is added, the mixture being agitated for 5 minutes, the temperature raises from 20° to 27° C. Acid sludge is removed after 3 hours of settling. Thereafter 0.33 part oleum with an $SO_3$ content of 20 percent is added to the oil with 15 minutes. Temperature raises from 27° to 50° C. After 10 minutes agitation, 22 vol. percent water calculated on oleum are added within 10 minutes. After the acid sludges have settled, the composition of the sulfonic acids is:
- 25.4 percent sulfonic acids
- 2.3 percent sulfuric acid
- 72.3 percent unsulfonated oil.

These sulfonic acids have an average molecular weight of 460 and will be called hereafter sulfonic acids F.

EXAMPLE I

This example points out the feasibility of using ammonium carbonate in order to purify sulfonic acids.

To 1 kg sulfonic acids A, previously heated to 37° C, 1.5 weight percent ammonium carbonate is added under control of the foam originating from evolution of carbon dioxide. A temperature of 50° C is reached and kept constant during five hours. The sulfuric acid content drops from 1.7 to 0.49 percent after one hour, to 0.08 percent after two hours and to 0.09 percent after five hours, it thus appears a reaction time of two hours is long enough.

When same reaction is carried out at 65° C, a reaction time of one hour is already sufficient for reaching the minimum sulfuric acid content.

In this example, just as in the following, no difference is made, in the expression of results, between free sulfuric acid and the sulfuric acid which could be present as a colloidal dispersion of ammonium salts.

EXAMPLE II

This example points out the use of gaseous ammonia. Through 1,000 g sulfonic acids B, previously heated to 30° C, 0.312 mole ammonia is bubbled at a rate of 0.0235 mole/minute. The temperature rises to 45° C. The mixture is thereafter agitated for one hour, the temperature being kept constant. Ammonium hydrogen sulfate is separated by filtration. To 900 grams of filtered sulfonic acids 140 grams of spindle oil are added; hexane is evaporated, and the resulting solution contains 70 percent sulfonic acids and only 0.09 percent sulfuric acid.

In this example and in the following, no difference is made, in the expression of results, between free sulfuric acids and those present as ammonium salts.

EXAMPLE III

This example points out the high rate of formation of the ammonium hydrogen sulfate precipitate and the fact that the process can easily be run continuously.

To 1500 grams of sulfonic acids C, previously heated to 30° C, 0.44 mole of ammonia is bubbled within ten minutes and the mixture is then agitated for five minutes more. The diluted sulfonic acids are immediately filtered. To 1000 grams of filtered sulfonic acids 90 grams of spindle oil are added. Hexane is then evaporated under a slight nitrogen bubbling. The resulting solution contains 70 percent sulfonic acids and only 0.17 percent sulfuric acid.

When exactly the same experiment is repeated, the liquid being agitated for one hour instead of five minutes after the addition of ammonia, the residual sulfuric acid content reaches 0.15 percent i.e., hardly less than previously.

EXAMPLE IV

This example points out the application of this process to the purification of dodecylbenzene sulfonic acid.

To 200 g sulfonic acids D, 150 g xylol are added, then 0.4 mole ammonia is bubbled at a rate of 0.01 mole/minute, the temperature being kept constant at nearly 45° C; the mixture is agitated one hour more after ammonia bubbling has ceased and ammonium hydrogen sulfate is removed by filtration. The resulting solution contains 54 percent sulfonic acids and 0.49 percent sulfuric acid.

EXAMPLE V

This example points out the fact that the precipitation of ammonium hydrogen sulfate is under control of an equilibrium between the neutralization of sulfuric acid and that of sulfonic acids. It also points out that an excess of ammonia results in a decreased removal of sulfuric acid. It finally points out that the ammonia needed for the precipitation of ammonium hydrogen sulfate may be supplied as the ammonium sulfonates corresponding to the contaminated sulfonic acids.

Through 1,000 g sulfonic acids C, previously heated to 30° C, 11.1 g ammonia are bubbled, i.e., 400% of the theoretical amount needed for the formation of ammonium hydrogen sulfate. The temperature of the solution is kept constant at 45° C for one hour after bubbling has ceased. Ammonium hydrogen sulfate is removed by filtration from half of the sample, then solvent is evaporated. The sulfuric acid content of the concentrated sulfonic acids is 0.53 percent, i.e., very much higher than in Example III.

To the remaining 500 g sulfonic acids, converted in major part to ammonium sulfonates, 500 g untreated sulfonic acids C are added, then the mixture is agitated at 50° C for ninety minutes. The ammonium hydrogen sulfate thus formed is removed by filtration and the solvent is evaporated. The sulfuric acid content of the sulfonic acids drops to 0.18 percent, i.e., to a definitely better value.

EXAMPLE VI

This example points out the fact that the present invention allows purification of sulfonic acids containing very high amounts of sulfuric acid without posing any filtration difficulty.

Through 1,000 g sulfonic acids E, previously heated to 30° C, 0.6 mole ammonia is bubbled, the temperature rising to 50° C. Agitation is continued for one hour at the same temperature. To the mixture 1 percent of a filtration aid is added, then filtration is carried out on a laboratory pressure filter with a capacity of 2 liters, under a pressure of 0.8 kg/cm2. Filtration takes place regularly and is achieved within three minutes. After the solvent has been vaporized, the resulting solution contains 91.4 percent sulfonic acids and only 0.12 sulfuric acid.

EXAMPLE VII

This example points out that virtually every sulfonic acid can be purified according to the process of the present invention. Indeed, in this example, natural sulfonic acids with various structures, including alkylnaphthalenesulfonic acids, undergo a very efficient purification.

Through 1,000 g sulfonic acids F, previously heated to 45° C, 0.314 mole ammonia is bubbled, the temperature being allowed to rise to 68° C. Nitrogen is thereafter bubbled for 20 minutes at the same temperature, then agitation is continued for one hour. After the mixture has been filtered, its sulfuric acid content has dropped to 0.06 percent.

EXAMPLE VIII

This example points out the fact that the process is based on a balanced reaction, and that therefore it is even feasible to carry out the purification by means of diammonium sulfate.

To 1,000 g sulfonic acids B, previously heated to 30° C, 0.312 mole diammonium sulfate is added while the temperature rises to 68° C. This temperature is kept constant for four hours under fair agitation. Ammonium hydrogen sulfate is separated by filtration. To 900 g filtered sulfonic acids 140 g spindle oil are added; after hexane has been vaporized, the resulting solution contains 70 percent sulfonic acids and 0.2 percent residual sulfuric acid.

What is claimed is:

1. Process of reducing the sulfuric acid content of alkylaryl sulfonic acids having a molecular weight between 300 and 650 containing from about 1 to 15 percent of sulfuric acid, as contaminant, comprising treating said sulfinic acids with a neutralization agent selected from the group consisting of ammonia, diammonium sulfate, ammonium sulfide, ammonium bicarbonate, ammonium carbonate and ammonium alkarylsulfonates corresponding to the contaminated alkylaryl sulfonic acids to form crystalline ammonium hydrogen sulfate in the neutralization, and mechanically separating said crystalline salt from the mixture.

2. The process as defined in claim 1 wherein the neutralization agent is added to alkylaryl sulfonic acid in ratio such that the number of equivalents of added ammonia is equal to the sum of the number of moles of the sulfuric acid content of the alkylaryl sulfonic acids and of between 0 and 30 percent of the number of moles of alkylaryl sulfonic acids.

3. Process as defined in claim 1 wherein the neutralization agent is ammonia added in such ratio that the number of equivalents of ammonia added is equal to the sum of the number of moles of the sulfuric acid content and between 0 and 30 percent of the number of moles of alkylaryl sulfonic acids.

4. Process as defined in claim 1 wherein the neutralization agent is ammonium carbonate added in such ratio that the number of equivalents of ammonia added is equal to the sum of the number of moles of the sulfuric acid content and between 0 and 30 percent of the number of moles of alkylaryl sulfonic acids.

5. The process as defined in claim 1 wherein the neutralizing agent is ammonium salts of alkylaryl sulfonic acids added in such a ratio that all the sulfuric acid content is neutralized and a content of from 0 to 30 percent of ammonium salt of the alkylaryl sulfonic acids remains.

6. The process as defined in claim 1 wherein the neutralization is carried out in the presence of from 1 to 75 percent of a solvent selected from the group comprising the hydrocarbons and chlorinated hydrocarbons.

7. The process as defined in claim 1 wherein the neutralization is carried out at a temperature of 0° to 80°C.

8. The process as defined in claim 1 wherein the neutralization is carried out at a temperature of 20° to 80°C.

9. Process as defined in claim 1 wherein the neutralization agent is diammonium sulfate added in such ratio that the number of equivalents of ammonia added is equal to the sum of the number of moles of the sulfuric acid content and between 0 and 30 percent of the number of moles of alkylaryl sulfonic acids.

10. Process as defined in claim 1 wherein the neutralization agent is ammonium sulfide added in such ratio that the number of equivalents of ammonia added is equal to the sum of the number of moles of the sulfuric acid content and between 0 to 30 percent of the number of moles of alkylaryl sulfonic acids.

11. Process as defined in claim 1 wherein the neutralization agent is ammonium bicarbonate added in such ratio that the number of equivalents of ammonia added is equal to the sum of the number of moles of the sulfuric acid content and between 0 and 30 percent of the number of moles of alkylaryl sulfonic acids.

12. The process as defined in claim 4 wherein the ammonia is added continuously to effect neutralization upon continuous flowing liquid alkylaryl sulfonic acids.

* * * * *